Patented Feb. 26, 1946

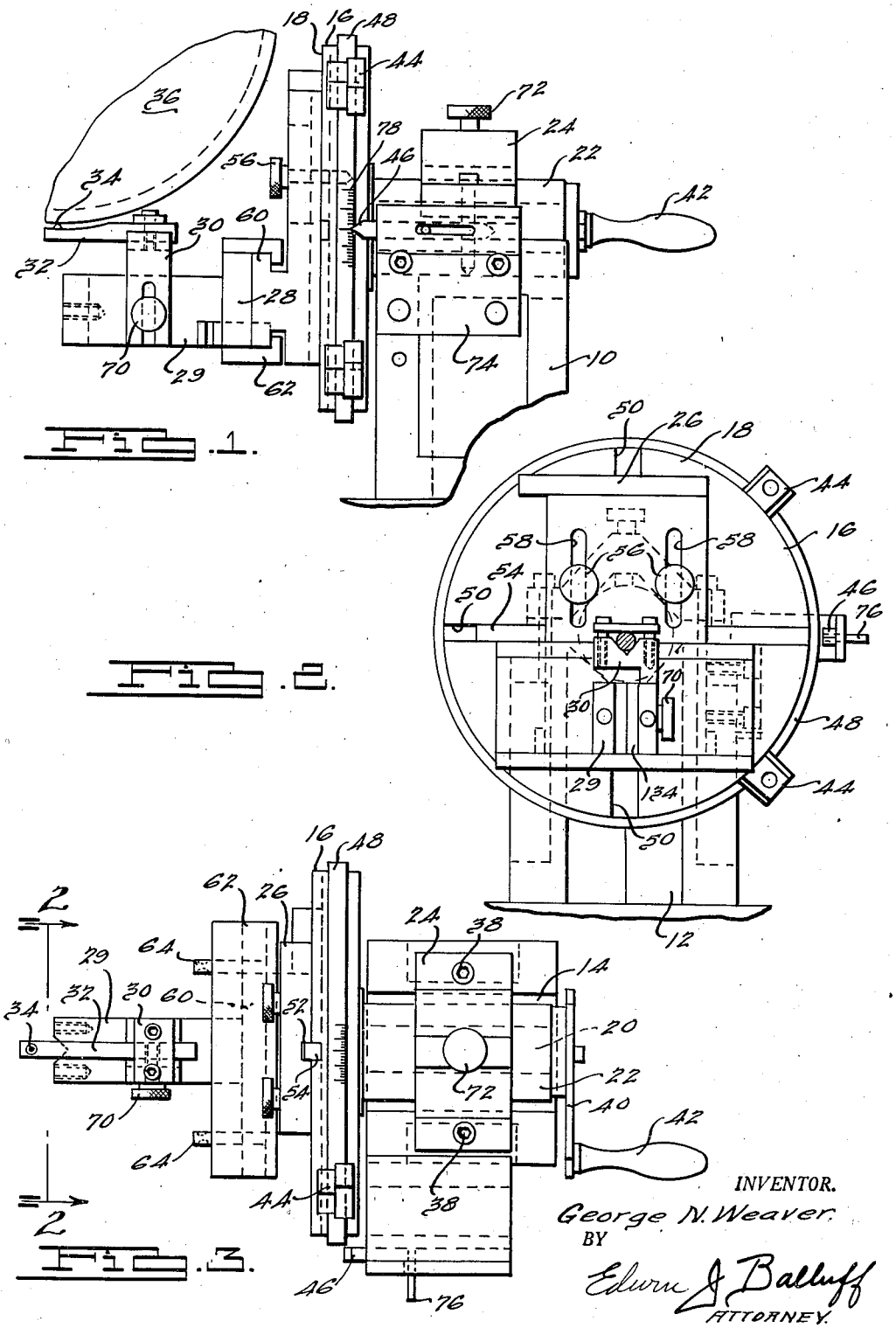

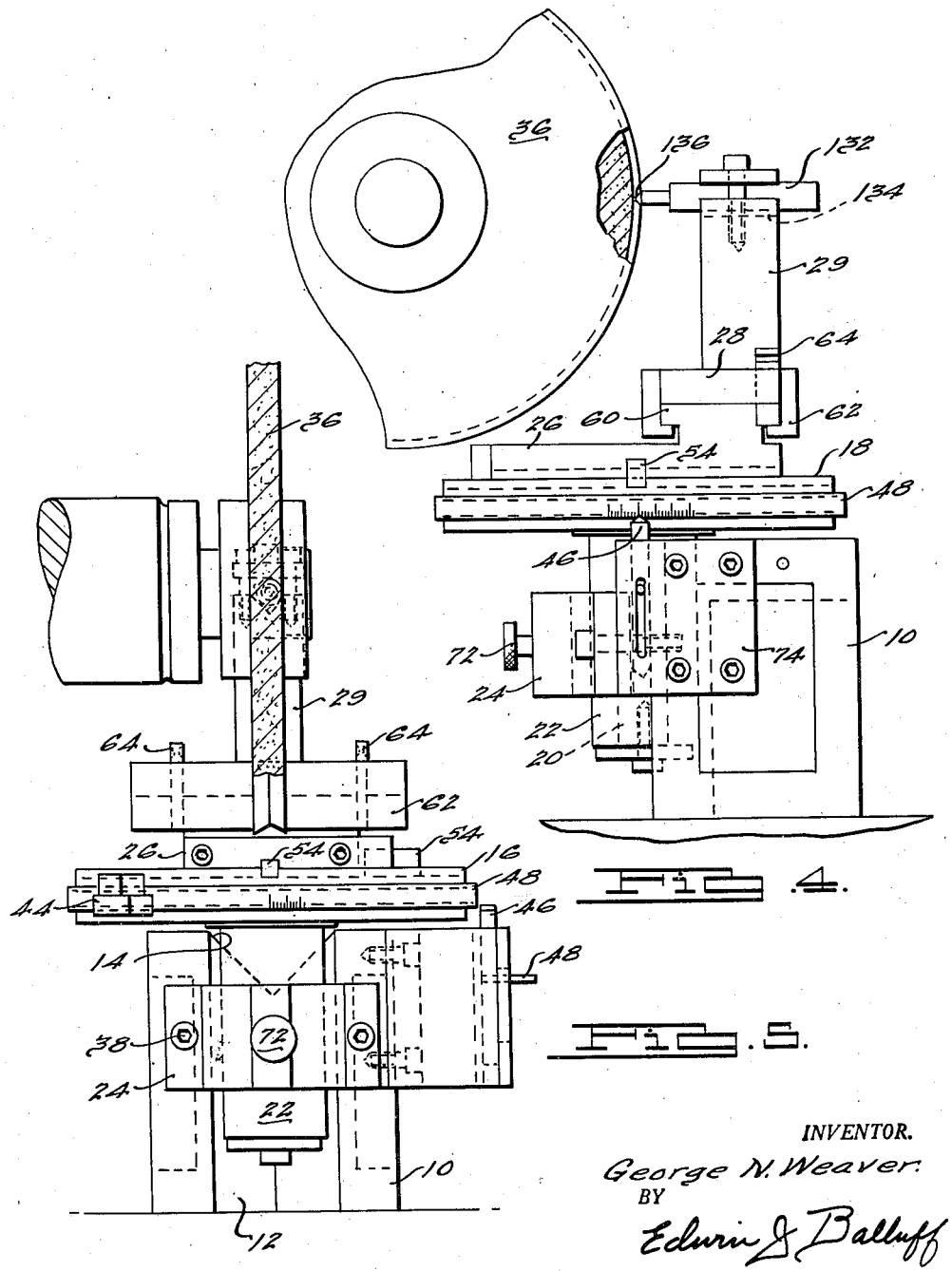

2,395,598

UNITED STATES PATENT OFFICE 2,395,598

RADIUS AND ANGLE DRESSER

George N. Weaver, Detroit, Mich.

Application March 12, 1945, Serial No. 582,310

9 Claims. (Cl. 125—11)

This invention relates to radius and angle dressers and has particular reference to certain new and useful improvements therein to increase the utility of the tool.

Principal objects of the invention therefore are to provide:

A new and improved radius and angle dresser;

A radius and angle dresser in which the parts thereof are constructed and arranged so as to increase the utility of the tool and also make the tool useful for dressing a grinding wheel either at the front of the wheel or below the wheel;

A radius and angle dresser which is detachably mounted upon a rotary surface so that such surface may be employed for other tool room purposes.

Other and further objects of the invention will be apparent from the following description and claims and will be understood by reference to the accompanying drawings, of which there are two sheets, which, by way of illustration, show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawings:

Fig. 1 is a fragmentary side elevational view of a device embodying the invention;

Fig. 2 is an elevational view, partially in section, of the face of the device taken along the line 2—2 of Fig. 3;

Fig. 3 is a plan view of the device as illustrated in Fig. 1;

Fig. 4 is a side elevational view of the device arranged for dressing at the front of a grinding wheel; and Fig. 5 is a side elevational view of the lefthand side of the device as illustrated in Fig. 4.

As embodied in the arrangement illustrated in Figs. 1, 2 and 3, a radius and angle dresser incorporating my invention includes a V-block 10 having V-grooves 12 and 14 in two different faces thereof which are normal to each other, a rotary member or table 16 providing a finished work surface 18 on one side thereof and having a spindle 20 projecting from the opposite face thereof, the axis of the spindle 20 forming the axis of rotation of the table 16, such spindle 20 being journaled in a bushing 22 which is detachably clamped in the V-groove 14 by a clamping member 24 which straddles the bushing, a guide member 26 which is detachably mounted upon the surface 18, a slide 28 which is slidably mounted upon the guide member 26, a tool holder 30 which is adjustably positioned on the post or standard 29 of the slide 28, and a tool 32 the shank of which is removably clamped in the tool holder 30 and which tool includes a diamond point 34 operatively positioned with respect to and below the periphery of a grinding wheel 36 for dressing the radius or angle thereof. It should be noted that all of the parts of the device are accurately finished to tolerances measured in ten thousandths of an inch.

The V-block 10 comprises a rectangular shaped block adapted to be supported on a surface of a machine, such as a surface grinder, and to be clamped thereon or held in position by means of a magnetic chuck. As illustrated in Figs. 1, 2 and 3, the top face of the V-block 10 is relieved to provide the V-groove 14, while one of the vertical faces is relieved to provide the V-groove 12.

As illustrated in Figs. 1, 2 and 3, the axis about which the table 16 is rotatable is horizontally arranged, the bushing 22 being clamped in the groove 14 by means of the clamp 24 which is held in position by means of screws 38 which hold the bushing 22 against rotation. The end of the spindle 20 is shaped to receive a crank 40 including a handle 42 so as to provide a means for rotating the spindle 20 and the table 16 about its axis within the limits as determined by the stops 44 carried by the table 16 and the stop 46 carried by the V-block 10. The table 16 is provided with a peripheral rib 48 which is shaped to receive the stops 44 which are detachably clamped to the rib 48. The stops 44 are adjustably positioned on the table 16 so as to cooperate with the stationary stop 46 to limit the oscillation of the table 16 about its axis.

The surface 18 is provided with two diametrically arranged slots or grooves 50. The guide member 26 on the surface thereof which seats against the surface 18 is provided with cross grooves 52. Bars 54 having close fit in the grooves 50 and 52 function to locate the guide 26 relative to the surface 18 while thumb screws 56 extending through slots 58 in the guide member 26 cooperate with threaded holes in the surface 18 for clamping the guide member 26 against the surface 18.

The guide member 26 is formed to provide a T-shaped guide 60 which slidably receives a complementary shaped guide 62 provided on the slide 28 for slidably supporting the slide 28 in the position illustrated for movement across the peripheral face of the grinding wheel 36. The slide 28, however, is held against sliding movement on the guide 60 by means of pins 64 which extend through slots in the slide 28 and abut the ends of the T-guide 60, as illustrated in Fig. 3, the slide 28 being so located with respect to the T-guide 60 and the same with respect to the surface 18 that the diamond point 34 will swing in an arc about the axis of the table 16.

The tool 32 is clamped in the tool holder 30 which is adjustably positioned for vertical movement relative to the standard 29 of the slide 28 and held in such position by means of a thumb screw 70 which, as illustrated, clamps the forked end of the tool holder 30 in the slot in the standard 29. It is to be understood that the parts just described may be so positioned with reference to each other and to the rotary table 16 that any desired arc or path of travel for the diamond point 34 may be obtained for dressing the radius of the grinding wheel 36 to the desired form.

For angle dressing one or both of the pins 64 may be removed so as to permit sliding movement of the slide 28 relative to the T-guide. A thumb screw 72 carried by the clamp 24 and extending through a hole in the bushing 22 is provided for cooperating with the spindle 20 to lock the same in any position thereof when the slide 28 is reciprocated for dressing the angle of the grinding wheel 36.

The stop 46 is slidably mounted in a bracket 74 which is clamped to the V-block and an arm 76 projects from the stop 46 so that the same may be moved out of the path of movement of the stops 44 if desired. In addition, the peripheral surface of the rib 48 is provided with indicia 78 to indicate the angular movement in both directions of rotation of the table 16.

In the arrangement as illustrated in Figs. 4 and 5, the bushing 22 is clamped in the V-groove 12 so that the axis of rotation of the spindle 20 and of the table 16 is vertically arranged. With this arrangement the surface 18 is horizontally arranged and the guide member 26 and slide 28 may be so arranged that the radius dresser is positioned for dressing the radius or angle of the wheel 36 at the front thereof.

A tool 132 of a different form than that illustrated in Figs. 1 to 3 is clamped in a V-groove 134 at the upper end of the post 29, and this tool 132 is provided with a diamond point 136 for dressing the radius or angle of the wheel 36.

The slide 28 is, as previously described, mounted upon the T-guide 60 but locked against sliding movement thereon during radius dressing by means of the pins 64. The thumb screw 72 may be employed to lock the spindle 20 against rotation, and when released the table 16 is free to rotate within the limits as determined by the stops 44 and the stop 46.

It will thus be observed that I have provided a radius and angle dresser which includes a V-block having a V-groove in at least two faces thereof normal to each other, a rotary table or surface having a bushing which is arranged to be clamped in either one of the V-grooves of the V-block, and a radius dresser which may be adjustably positioned on the rotary table and which, when so positioned, has its diamond point positioned for cooperation with the periphery of a grinding wheel for dressing the radius or the angle thereof.

As the bars 54 and the guide member 26 and the parts carried thereby are removably positioned upon the surface 18, the same may be employed when such parts are removed as a surface for holding other work on which operations are to be performed. The table 16 may be so positioned on the V-block 10 that the tool may be arranged for dressing either below or at the front of the wheel. Also, when the table is separated from the V-block 10, the same may be used for other tool room or similar purposes.

While I have illustrated and described a preferred embodiment of my invention, it is understood that this is capable of modification and I therefore do not wish to be limited to the precise details set forth but desire to avail myself of such changes and alterations which fall within the purview of the following claims.

I claim:

1. A radius and angle dresser comprising a V-block having a V-groove in two faces thereof, a rotary surface having a spindle, a bushing in which said spindle is journaled, means for selectively clamping said bushing in either one of the V-grooves of the V-block for rotatably mounting said surface, and a radius dresser detachably positioned on said rotary surface and including a guide member detachably secured to said surface, a slide slidably mounted on said guide member, stops for limiting the sliding movement of the slide on said guide member, said slide being provided with a post, means for mounting a tool on said post, said tool having a diamond point arranged for cutting the peripheral surface of a grinding wheel for dressing the radius or angle of said wheel in accordance with the setting of said rotary surface and guide member and slide.

2. A radius and angle dresser comprising a V-block having a V-groove in two faces thereof, a rotary surface having a spindle, a bushing in which said spindle is journaled, means for selectively clamping said bushing in either one of the V-grooves of the V-block for rotatably mounting said surface, and a radius dresser detachably positioned on said rotary surface and including a guide member detachably secured to said surface, a slide slidably mounted on said guide member, stops for limiting the sliding movement of the slide on said guide member, said slide being provided with a post, means for mounting a tool on said post, said tool having a diamond point arranged for cutting the peripheral surface of a grinding wheel for dressing the radius or angle of said wheel in accordance with the setting of said rotary surface and guide member and slide, and cooperating stops on said rotary surface and V-block for limiting the rotation of said rotary surface.

3. A radius and angle dresser comprising a V-block having a V-groove in two faces thereof normal to each other, a rotary surface having a bushing on which it is rotatably mounted, means for selectively clamping said bushing in either one of the V-grooves of the V-block for rotatably mounting said surface, and a radius dresser detachably positioned on said rotary surface and having a diamond point arranged for cutting engagement with a grinding wheel for dressing the same to the radius for which said radius dresser is mounted on said rotary surface.

4. A radius and angle dresser comprising a V-block having a V-groove in two faces thereof normal to each other, a rotary surface having a spindle, a bushing in which said spindle is journaled, clamping means for selectively securing said bushing in either one of the V-grooves of the V-block for rotatably mounting said surface, the radius of said surface being less than the length of either of said two faces, and a radius dresser detachably positioned on said rotary surface and including a guide member detachably secured to said surface, a slide slidably mounted on said guide member, said slide being provided with a post, means for mounting a tool on said post, said tool having a diamond point arranged for cutting the peripheral surface of a grinding wheel for dressing the radius or angle of said wheel in accordance with the setting of said rotary surface and guide member and slide.

5. A radius and angle dresser comprising a rotary surface having a spindle, a bushing in which said spindle is journaled, a radius dresser mounted on said rotary surface and including a guide member secured to said surface, a slide slidably mounted on said guide member, said slide being provided with a post, means for mounting a tool on said post, said tool having a diamond point arranged for cutting the peripheral surface of a grinding wheel for dressing the radius or angle of said wheel, a V-block having a V-groove in two faces thereof normal to each other, and clamping means for selectively securing said bushing in either of said V-grooves for rotatably mounting said surface and so that said diamond point may be positioned either under or in front of said wheel for cooperation therewith.

6. A radius and angle dresser comprising a rotary surface having a spindle, a bushing in which said spindle is journaled, a radius dresser mounted on said rotary surface and including a guide member secured to said surface, a slide slidably mounted on said guide member, said slide being provided with a post, means for mounting a tool on said post, said tool having a diamond point arranged for cutting the peripheral surface of a grinding wheel for dressing the radius or angle of said wheel, a V-block having a V-groove in two faces thereof normal to each other, clamping means for selectively securing said bushing in either of said V-grooves for rotatably mounting said surface and so that said diamond point may be positioned either under or in front of said wheel for cooperation therewith, and cooperating stops on said rotary surface and V-block for limiting the rotation of said rotary surface.

7. A radius and angle dresser comprising a rotary surface having a spindle, a bushing in which said spindle is journaled, a radius dresser mounted on said rotary surface and including a guide member secured to said surface, a slide slidably mounted on said guide member, said slide being provided with a post, means for mounting a tool on said post, said tool having a diamond point arranged for cutting the peripheral surface of a grinding wheel for dressing the radius or angle of said wheel, a V-block having a V-groove in two faces thereof normal to each other, clamping means for selectively securing said bushing in either of said V-grooves for rotatably mounting said surface and so that said diamond point may be positioned either under or in front of said wheel for cooperation therewith, and stops for limiting the sliding movement of the slide on said guide member.

8. A radius and angle dresser comprising a V-block having a V-groove in two faces thereof normal to each other, a rotary surface having a spindle, a bushing in which said spindle is journaled, clamping means for selectively securing said bushing in either one of the V-grooves of the V-block for rotatably mounting said surface, the radius of said surface being less than the length of either of said two faces, a radius dresser detachably positioned on said rotary surface and including a guide member detachably secured to said surface, a slide slidably mounted on said guide member, said slide being provided with a post, means for mounting a tool on said post, said tool having a diamond point arranged for cutting the peripheral surface of a grinding wheel for dressing the radius or angle of said wheel in accordance with the setting of said rotary surface and guide member and slide, and a crank on said spindle for turning said surface.

9. A radius and angle dresser comprising a V-block having a V-groove in one face thereof, a rotary surface having a spindle, a bushing in which said spindle is journaled and which is adapted to be clamped in said V-groove of the V-block for rotatably mounting said surface, and a radius dresser mounted on said rotary surface and including a guide member detachably secured to said table, a slide mounted on said guide member, said slide being provided with a post, means for supporting a tool on said post, said tool having a diamond point arranged for cutting the peripheral surface of a grinding wheel for dressing the radius or angle of said wheel in accordance with the setting of said rotary surface and guide member and slide.

GEORGE N. WEAVER.